Aug. 27, 1940.   O. J. BROCK   2,212,656
STONE SAWING MACHINE
Filed Oct. 13, 1939   2 Sheets-Sheet 1

INVENTOR
Ottie J. Brock.
BY
Corbett & Mahoney
ATTORNEYS

Aug. 27, 1940.　　　　　O. J. BROCK　　　2,212,656
STONE SAWING MACHINE
Filed Oct. 13, 1939　　　　2 Sheets-Sheet 2

INVENTOR
Ottie J. Brock.
BY
Corter & Mahoney
ATTORNEYS

Patented Aug. 27, 1940

2,212,656

UNITED STATES PATENT OFFICE 2,212,656

STONE SAWING MACHINE

Ottie J. Brock, Vincennes, Ind.

Application October 13, 1939, Serial No. 299,335

11 Claims. (Cl. 125—16)

My invention relates to a stone sawing machine. It has to do, more particularly, with the stone sawing machine of the reciprocating cutter bar type wherein shot or other abrasive is employed with the cutter bars in order to produce the cutting action.

In my Patent No. 2,165,335, I disclose a stone sawing machine which includes a plurality of vertically disposed longitudinally spaced cutter bars. These cutter bars are suspended from an upper carriage and extend downwardly through a guide carriage. Suitable means is provided for reciprocating both carriages.

I have found in actual use that the machine disclosed in my patent works very efficiently. However, I have found it desirable to provide different means in association with the lower guide carriage for spacing the cutter bars and keeping them in spaced relationship. Also, I have found it desirable to provide different guiding means to prevent lateral movement of the lower ends of the cutter bars.

One of the objects of my invention is to provide a stone sawing machine of the type indicated wherein means is associated with the lower carriage for maintaining the cutter bars in spaced relationship, said means being of a very rugged nature and being so arranged that it may be adjusted so that the wearing action will occur on different portions thereof, thereby increasing the life of such means.

Another object of my invention is to provide means in association with the lower carriage for preventing lateral movement of the lower ends of the cutter bars, such means being of such a nature that it will permit the free passage of the abrasive around the cutter bars and, therefore, will prevent the abrasive from binding the cutter bars in the guide carriage.

The preferred embodiment of my invention is illustrated in the accompanying drawings wherein similar characters of reference designate corresponding parts and wherein.

Figure 1:
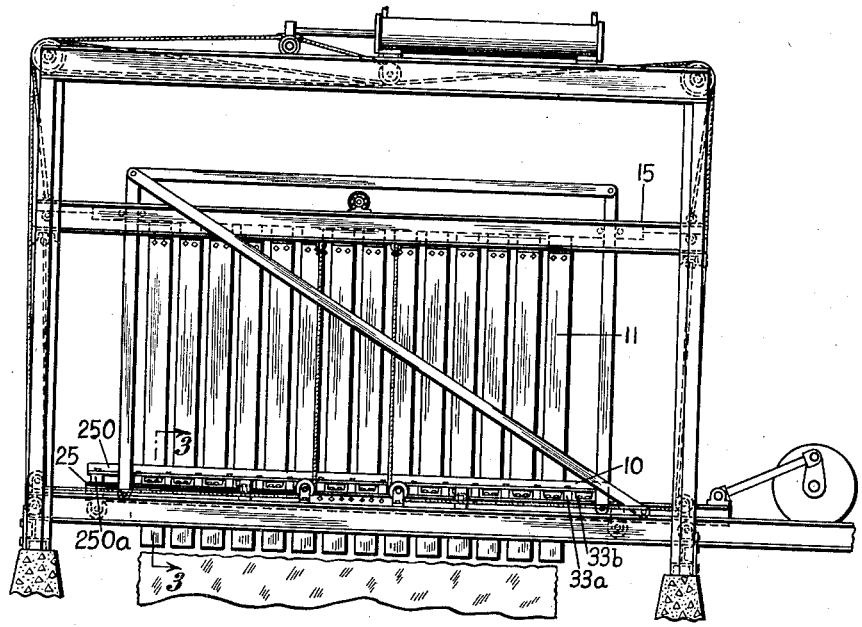
Figure 1 is a side elevation of a stone sawing machine having my invention incorporated therein.
Figure 2:
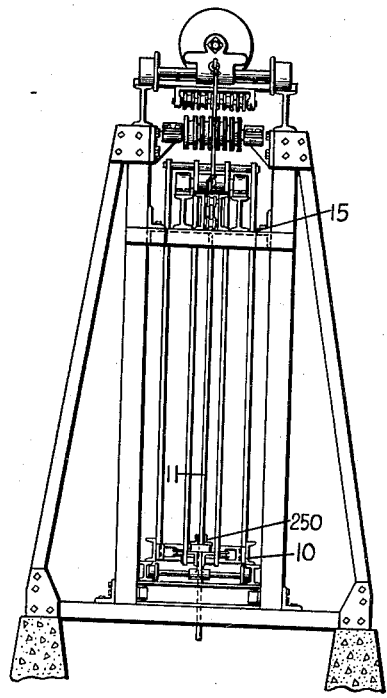
Figure 2 is an end elevation of the machine shown in Figure 1.
Figure 3:
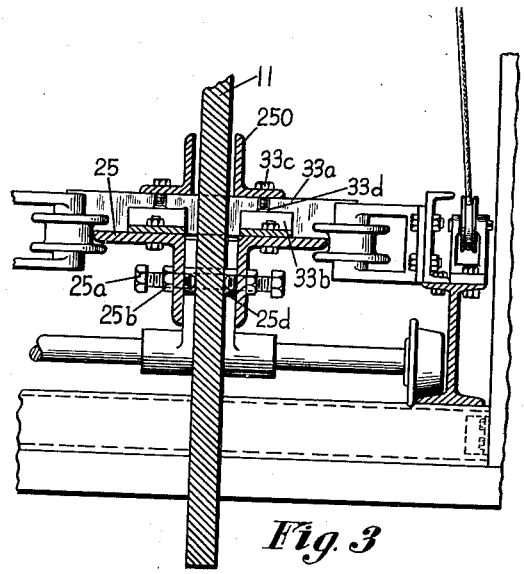
Figure 3 is a transverse vertical sectional view taken substantially along line 3—3 of Figure 1.

With reference to the drawings the stone sawing machine which I have illustrated is in its main structure substantially identical with that disclosed in my patent No. 2,165,335.

As disclosed in said patent the machine includes an upper carriage 15 which is vertically adjustable and from which spaced cutter bars 11 are suspended. These cutter bars pass downwardly through a lower guide carriage 10. The lower guide carriage 10 includes a pair of longitudinally extending guide members 25 which are in the form of angle irons.

In the present instance, the angle irons 25 are spaced farther apart so that there will be no danger of abrasives lodging between the faces of the cutter bars and the vertical flanges of the members 25. However, to prevent lateral movement of the lower ends of the cutter bars I provide a pair of guide bolts 25a disposed adjacent each face of each cutter bar. These guide bolts 25a are threaded through openings in the vertical flanges of the members 25. The bolts may be held in adjusted position by lock nuts 25b. The inner ends of the bolts are rounded as indicated at 25c. In using this guide bolt arrangement, the bolts on the opposite sides of the cutter bars are adjusted so that they extend inwardly to the proper extent to properly position the cutter bars laterally relative to the members 25. The bolts preferably are adjusted to such an extent that the inner ends of the oppositely disposed bolts are spaced apart a distance just slightly greater than the thickness of the cutter bars. It will be apparent that with this arrangement, if the abrasive works up between the members 25 and the cutter bars, no binding will result since the abrasive can freely pass on or drop from these spaces. The guide bolts will serve to effectively prevent lateral movement of the lower ends of the cutter bars. Vertical adjustment of the cutter bars in the carriage 10 will be permitted at all times since the abrasive will not bind the cutter bars in the lower carriage.

A plurality of spacer members 25d are preferably associated with the members 25 for maintaining them in spaced relationship throughout their length.

In the present instance, I also provide different means for keeping the cutter bars 11 in longitudinally spaced relationship. For this purpose I provide bars 33a of square cross section. One of these bars is disposed between each pair of adjacent cutter bars 11. Each bar extends transversely and rests on the upper surface of the members 25. In order to keep the bars 33a in spaced relationship I provide U-shaped brackets 33b which are bolted to the upper surfaces of the members 25. These members are disposed in pairs between the adjacent bars 33a. A pair of longitudinally extending angle arms 250 are disposed on the carriage 10 and are supported thereon in a suitable manner in such a manner that they are spaced above the members 25 a distance slightly greater than the thickness of the bars 33a. These members 250 are disposed on each side of the cutter bars and are spaced therefrom to permit free passage of abrasive therebetween. The members 250 and the brackets 33b serve to hold the members 33a in position. At properly spaced intervals one of the members 250 has set screws 33c threaded downwardly therethrough. These screws may extend into grooves 33d formed in the top surface of each bar 33a. However, one of these grooves may be formed in each surface of bar. The said screws 33c will prevent the members 33a from sliding longitudinally of themselves out of position.

Figure 4:
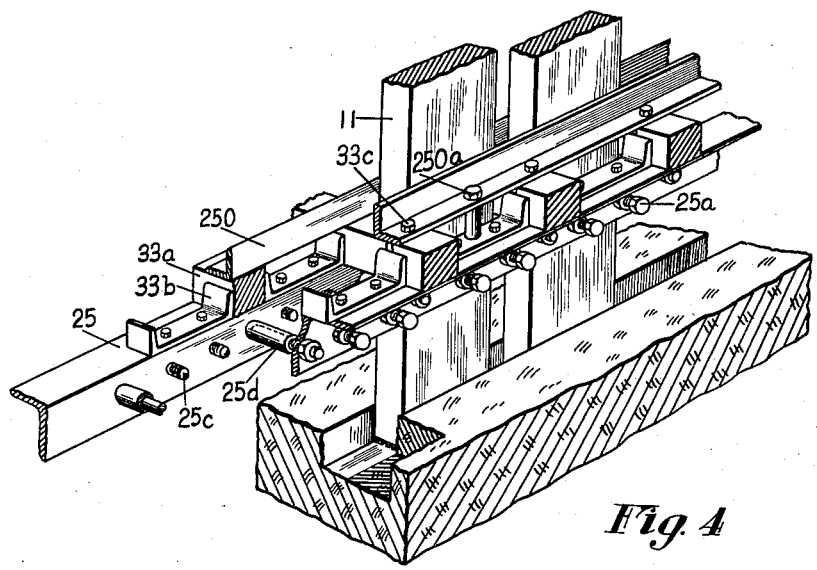
Figure 4 is a detail in perspective illustrating my new cutter bar spacing means and guiding means associated with the lower guide carriage.
Figure 5:
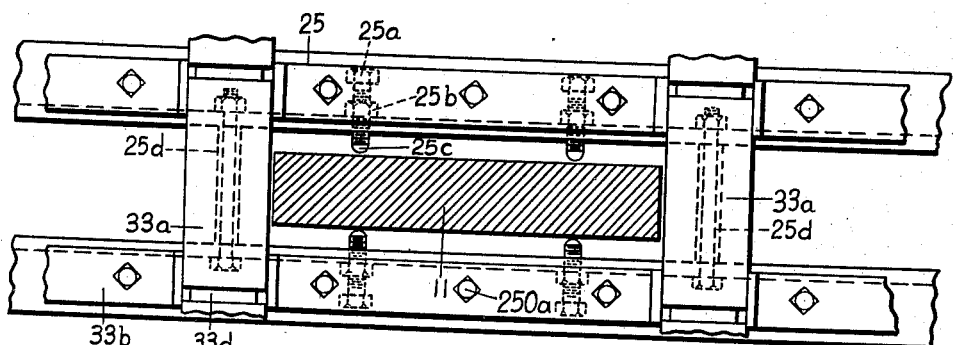
Figure 5 is a detail in horizontal section showing the cutter bar spacing means and guiding means.
Figure 6:
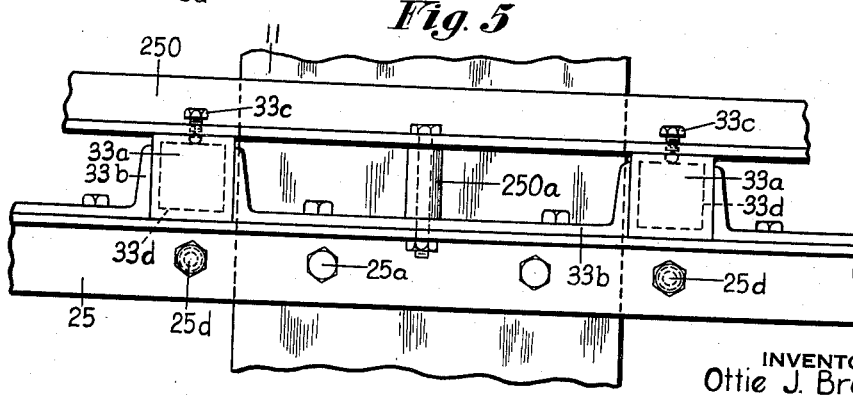
Figure 6 is a side elevation of the structure illustrated in Figure 5.

When the two carriages of the machine are reciprocated, the edges of the cutter bars will engage the edges of the spacer bars 33a. After considerable usage, these edges of the cutter bars will have grooves formed therein. When these bars wear to an undesirable extent, they may be removed merely by loosening screws 33c and then replaced with different surfaces in contact with the cutter bars. It will also be noted from Figure 4 that the bars 33a are of such a length that they may be adjusted longitudinally of themselves to different positions so as to prevent new wearing surfaces to the edges of the cutter bars. Thus, the bars 33a may be moved to any number of new positions to present new wearing surfaces. The said screws 33c may cooperate with grooves worn into the members 33a by the cutter bars for preventing longitudinal movement of the bars 33a.

It will be apparent that this cutter bar spacing means is of a very rugged construction and will last indefinitely due to the fact that the members 33a may be moved to so many different positions. If it is desired to rock the cutter bars as disclosed in my patent it is merely necessary for the spacer bars to be spaced apart slightly more than shown.

From the above description it will be apparent that I have provided novel guiding means for the lower ends of the cutter bars and novel spacing means for maintaining the lower ends in spaced relationship.

Having thus described my invention, what I claim is:

1. In a stone sawing machine, a cutter bar, means for preventing lateral movement of the lower end of the cutter bar, said means comprising longitudinally extending members disposed on opposite sides of the cutter bar and spaced from the sides of the cutter bar, and transversely extending members carried by said first-named members having their inner ends disposed adjacent the faces of said cutter bars.

2. In a stone sawing machine, a cutter bar, means for preventing lateral movement of the lower end of the cutter bar, said means comprising longitudinally extending members disposed on opposite sides of the cutter bar and spaced from the sides of the cutter bar, each of said members carrying transversely extending pins which have their inner ends disposed adjacent the face of said cutter bar.

3. In a stone sawing machine, a cutter bar, means for preventing lateral movement of the lower end of the cutter bar, said means comprising longitudinally extending members disposed on opposite sides of the cutter bar and spaced from the sides of the cutter bar, each of said members having bolts threaded therethrough which extend towards the face of said cutter bar.

4. In a stone sawing machine, an upper carriage, a cutter bar suspended from said upper carriage, a lower guide carriage, said lower guide carriage and said upper carriage being vertically adjustable relative to each other, said lower guide carriage comprising longitudinally extending members which are spaced apart and between which said cutter bar will extend, said members being spaced from the faces of said cutter bar, said members carrying transversely extending pins which project inwardly to a point adjacent the faces of said cutter bar.

5. In a stone sawing machine, an upper carriage, a plurality of cutter bars suspended from said upper carriage, a lower guide carriage, said carriages being vertically adjustable relative to each other, said lower guide carriage comprising longitudinally extending members which are spaced apart and between which said cutter bars extend, said members being spaced from the faces of said cutter bars, each of said members carrying a plurality of bolts threaded therethrough which project inwardly to points adjacent the faces of said cutter bars.

6. In a stone sawing machine, a plurality of vertically disposed longitudinally spaced cutter bars, means for supporting said cutter bars, means for maintaining the lower ends of said cutter bars in spaced relationship, said means comprising transversely extending bars, one of which is disposed adjacent each edge of each cutter bar, each of said transversely extending bars being of square cross section so that the different faces thereof may be presented through the edge of the cutter bar.

7. In a stone sawing machine, a plurality of vertically disposed longitudinally spaced cutter bars, means for supporting said cutter bars, means for maintaining the lower ends of said cutter bars in spaced relationship, said means comprising transversely extending bars disposed between adjacent cutter bars, each of said bars being of square cross section, means for holding said transverse bars in position, said means being of such a nature that said bars may be adjusted longitudinally of themselves to different positions.

8. In a stone sawing machine, an upper carriage, a lower guide carriage, said lower carriage comprising longitudinally extending members disposed in spaced relationship, a plurality of longitudinally spaced cutter bars suspended from said upper carriage and extending downwardly between said members, means for maintaining the lower ends of said cutter bars in spaced relationship, said means comprising transversely extending spacer bars of angular cross section disposed between adjacent cutter bars and resting on said longitudinally extending members.

9. In a stone sawing machine, an upper carriage, a lower guide carriage, said lower carriage comprising longitudinally extending members disposed in spaced relationship, a plurality of longitudinally spaced cutter bars suspended from said upper carriage and extending downwardly between said members, means for maintaining the lower ends of said cutter bars in spaced relationship, said means comprising transversely extending spacer bars of angular cross section disposed between adjacent cutter bars and resting on said longitudinally extending members, and means for holding said spacer bars in position, said means permitting adjustment of said bars longitudinally of themselves to different positions to present different wearing surfaces to the edge of the cutter bars.

10. In a stone sawing machine, an upper carriage, a lower guide carriage, said lower carriage comprising longitudinally extending members disposed in spaced relationship, a plurality of longitudinally spaced cutter bars, suspended from said upper carriage and extending downwardly between said members, means for maintaining the lower ends of said cutter bars, in spaced relationship, said means comprising transversely extending spacer bars of square cross section disposed between adjacent cutter bars and resting on said longitudinally extending members, spacer brackets secured to said longitudinally extending members for engaging the sides of said transverse bars and keeping them in spaced relationship, and a longitudinally extending member disposed on each side of the cutter bars for engaging the upper surfaces of said transverse bars.

11. In a stone sawing machine, an upper carriage, a lower guide carriage, said carriages being vertically adjustable relative to each other, a plurality of longitudinally spaced cutter bars suspended from the upper carriage, said lower carriage comprising longitudinally extending members which are spaced apart and between which the cutter bars extend, said members being spaced from the faces of the cutter bars, said members carrying inwardly extending guide pins which have their inner ends disposed adjacent the faces of said cutter bars, means for maintaining the lower ends of said cutter bars in spaced relationship, said means comprising transversely extending spacer bars of angular cross section disposed between adjacent cutter bars and resting on said longitudinally extending members.

OTTIE J. BROCK.